(12) United States Patent
Hyogo

(10) Patent No.: US 6,297,614 B2
(45) Date of Patent: Oct. 2, 2001

(54) CHARGING PADDLE

(75) Inventor: Takashi Hyogo, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/727,145

(22) Filed: Nov. 30, 2000

(30) Foreign Application Priority Data

Dec. 2, 1999 (JP) .................................................. 11-343645

(51) Int. Cl.⁷ ........................................................ H02J 7/00
(52) U.S. Cl. .................................................................. 320/108
(58) Field of Search .................................... 320/107, 108, 320/109; 336/DIG. 2; 361/212, 216, 217

(56) References Cited

U.S. PATENT DOCUMENTS 5,812,357 * 9/1998 Johansen et al. .
6,093,957 * 7/2000 Kwon .
6,208,255 * 3/2001 Conrad et al. .

* cited by examiner

*Primary Examiner*—Edward H. Tso
(74) *Attorney, Agent, or Firm*—Morgan & Finnegan, LLP

(57) ABSTRACT

A paddle is connected to an electricity supplying apparatus by a cable. The paddle is inserted into a receptacle located in a vehicle for charging a battery in the vehicle. A container, which is made of conductive resin, is located in the paddle to surround lines separated from the cable. Conductive plating layers are formed on the inner surface of the container. Noise radiated from the lines is absorbed by the plating layers and converted into a noise current. The noise current is conducted to a grounding member of the electricity supplying apparatus through a shield located in the cable. The noise current is also conducted to a grounding member of the vehicle through the receptacle. The plating layers permit the noise current to smoothly flow.

20 Claims, 8 Drawing Sheets

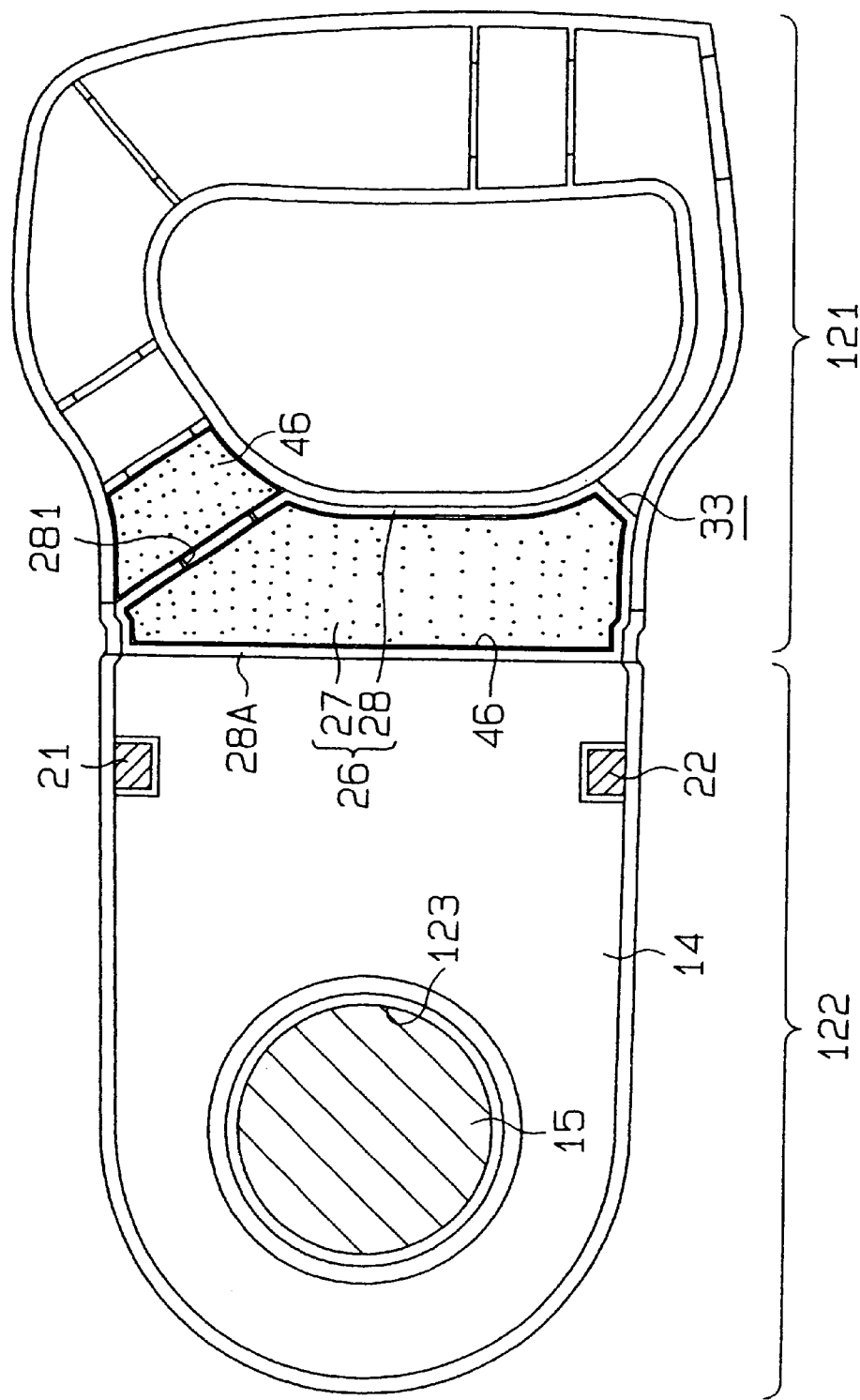

CHARGING PADDLE

BACKGROUND OF THE INVENTION

The present invention relates to a charging paddle of an inductive charger coupling, more particularly, to a noise reduction structure of a charging paddle. An inductive charger coupling typically includes a receptacle and a charging paddle, which supplies electricity to the receptacle from a power source.

FIG. 8 illustrates an inductive charger coupling, which includes a charging paddle 1 and a receptacle 6. The paddle 1 is attached to the distal end of a cable 3, which is connected to an electricity supplying apparatus 2. The receptacle 6 is located in an electric vehicle 5, which has a battery 4. As shown by dotted line in FIG. 8, the paddle 1 is plugged into the receptacle 6. The battery 4 is charged by electromagnetic induction between a coil in the paddle 1 and a coil in the receptacle 6.

When electricity is supplied from the electricity supplying apparatus 2 to the battery 4 through the paddle 1 and the receptacle 6, radiation noise is produced by the coils of the paddle 1 and the receptacle 6. The radiation noise adversely affects communication devices and other devices. To prevent radiation noise from escaping from the receptacle 6, the receptacle 6 is made of aluminum. Also, the paddle 1 has shielding member made of conductive resin. When the paddle 1 is plugged into the receptacle 6, the shielding member closes the opening of the receptacle 6. A plurality of conductive terminals are arranged at the opening of the receptacle 6. When the paddle 1 is in the receptacle 6, the terminals contact the shielding member. Radiation noise is absorbed by the shielding member, which is made of conductive resin, and is converted into a noise current. The noise current flows from the shielding member to a vehicle grounding terminal through the conductive terminals.

However, the shielding member has a relatively high resistance. Thus, the noise current flowing through the shielding member is limited, which hinders noise prevention.

SUMMARY OF THE INVENTION

Accordingly, it is an objective of the present invention to provide a charging paddle that effectively prevents radiation noise from escaping.

To achieve the foregoing and other objective and in accordance with the purpose of the present invention, a paddle of an inductive charger coupling is provided. The paddle is connected to a power source through a power line. Part of the power line is located in the paddle. The paddle is inserted into an opening of a receptacle for supplying electricity to a receptacle. The paddle includes a case, a conductive metal member and a conductor. The conductive metal member is located in the case. The conductive metal member absorbs noise radiated from the power line in the paddle and converts the absorbed noise into a noise current. The conductor conducts the noise current to the outside of the paddle. The conductor is electrically connected to the conductive metal member in the paddle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a cross-sectional view illustrating one of the casing members of the charging paddle shown in FIG. 2;

DETAILED DESCRIPTION OF THE PREFERRED EMBODIMENTS

A first embodiment of the present invention will now be described with reference to FIGS. 1 to 5.

Figure 1:
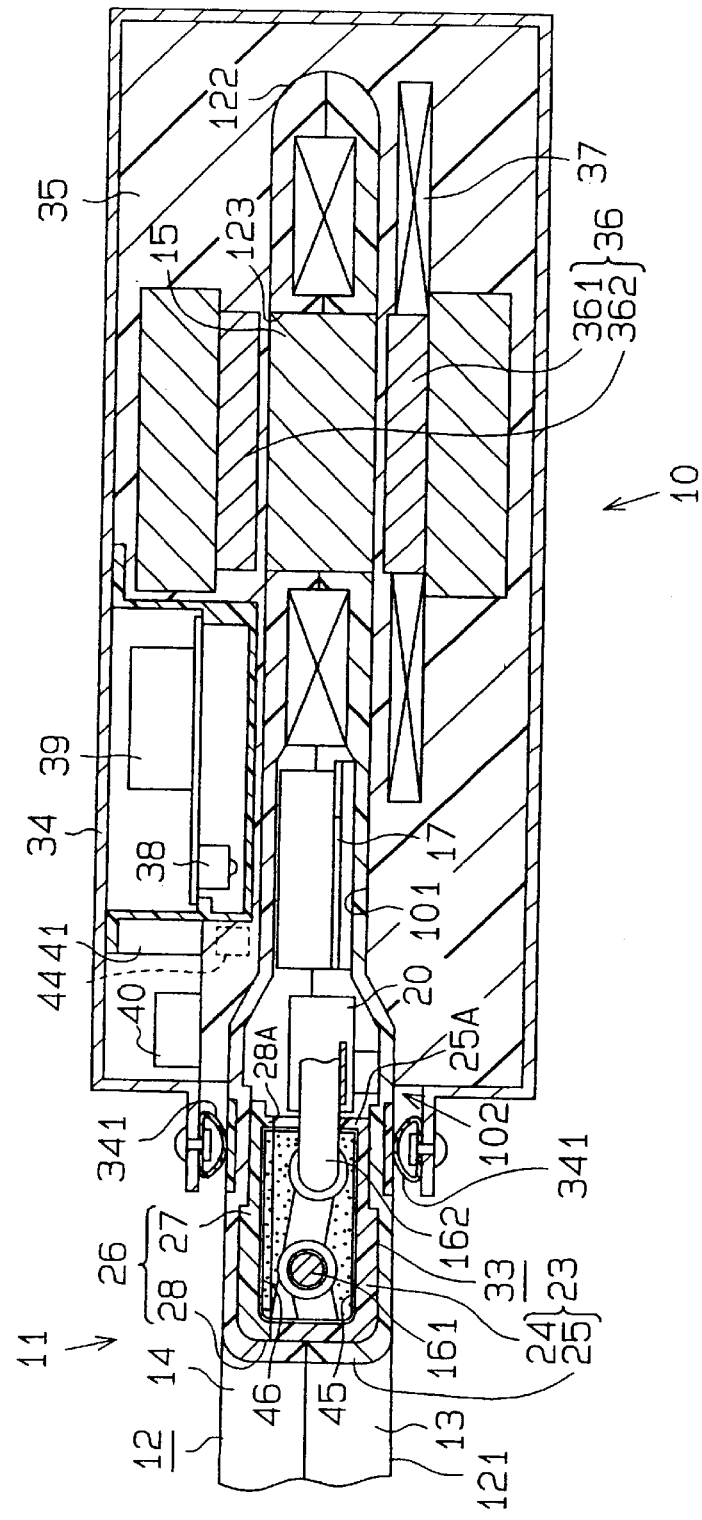
FIG. 1 is a cross-sectional view illustrating an inductive charger coupling according to a first embodiment of the present invention.
Figure 2:
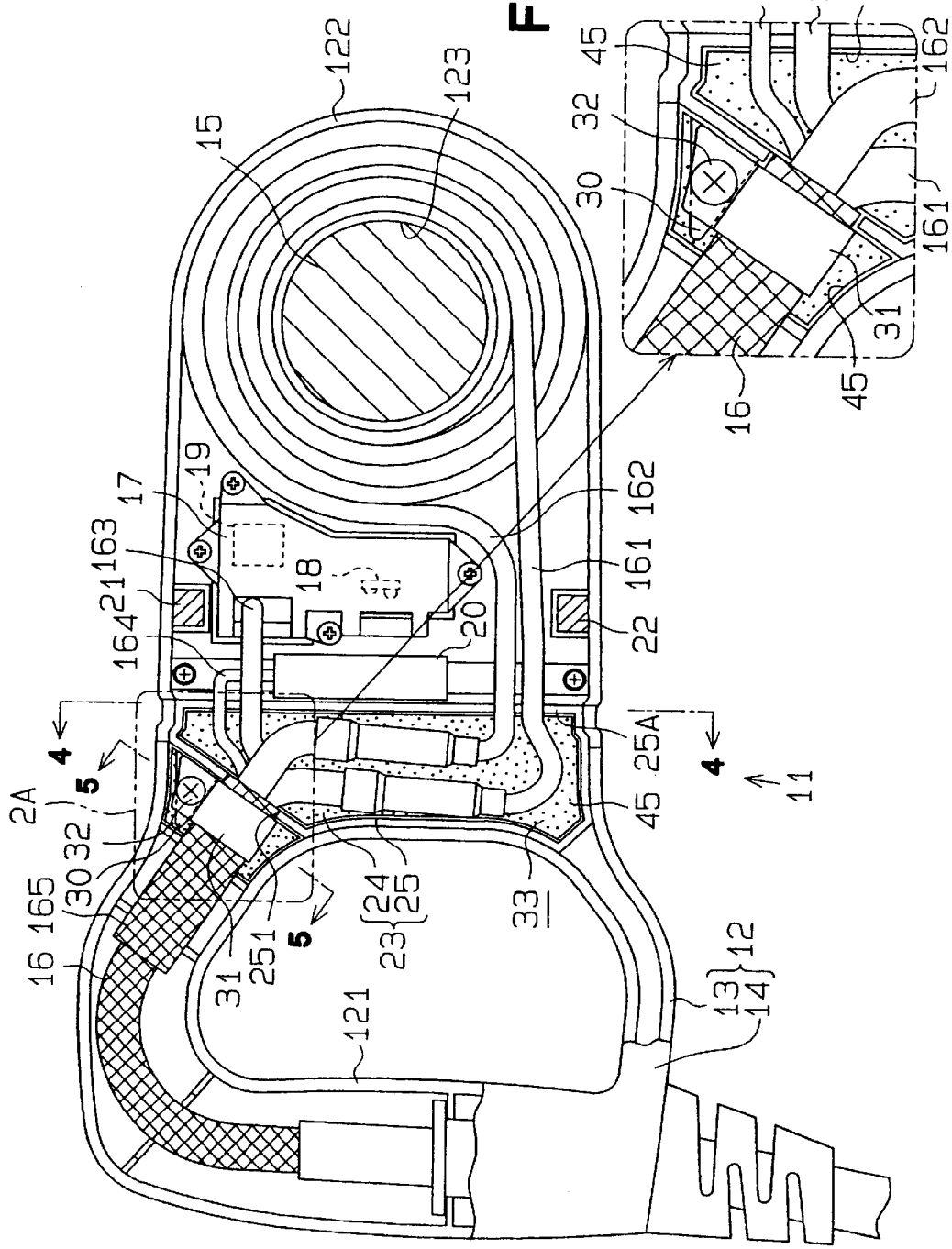
FIG. 2 is a cross-sectional view illustrating the charging paddle of the charger coupling shown in FIG. 1.

FIG. 1 illustrates a charger coupling according to the first embodiment. The coupling includes a receptacle 10 and a paddle 11. In FIG. 1, the paddle 11 is plugged into the receptacle 10. An electricity reception coil 37 of the receptacle 10 is electrically connected to a vehicle battery (not shown). The paddle 11 includes a casing 12. The casing 12 is formed by first and second resin casing members 13, 14, which are welded to each other. As shown in FIGS. 2 and 3, the casing 12 includes a grip 121 and a plug portion 122. A ferrite core 15 is fitted in a hole 123 of the plug portion 122. The paddle 11 is connected to a shielded charging cable 16. The cable 16 extends from a power source, which is an electricity supplying apparatus 42. Part of the cable 16 is located in the grip 121. Power lines 161, 162 in the cable 16 extend through the grip 121 and are wound about the ferrite core 15, which is located in the plug portion 122.

A substrate 17 and an antenna 20 are located on the inner surface of the first casing member 13 in the plug portion 122. The antenna 20 is electrically connected to a signal line 164, which is used for radio communication. An infrared sensor 18 and a communication circuit 19 are mounted on the substrate 17. The communication circuit 19 activates the infrared sensor 18. The substrate 17, the infrared sensor 18 and the communication circuit 19 form an infrared transmitter-receiver. The communication circuit 19 is connected to a signal line 163, which is used for infrared communication. The signal lines 163, 164 are included in the cable 16. As shown in FIGS. 2 and 3, magnets 21, 22 are located in the plug portion 122. The magnets 21, 22 are used for detecting that the paddle 11 is inserted into the receptacle 10.

Figure 4:
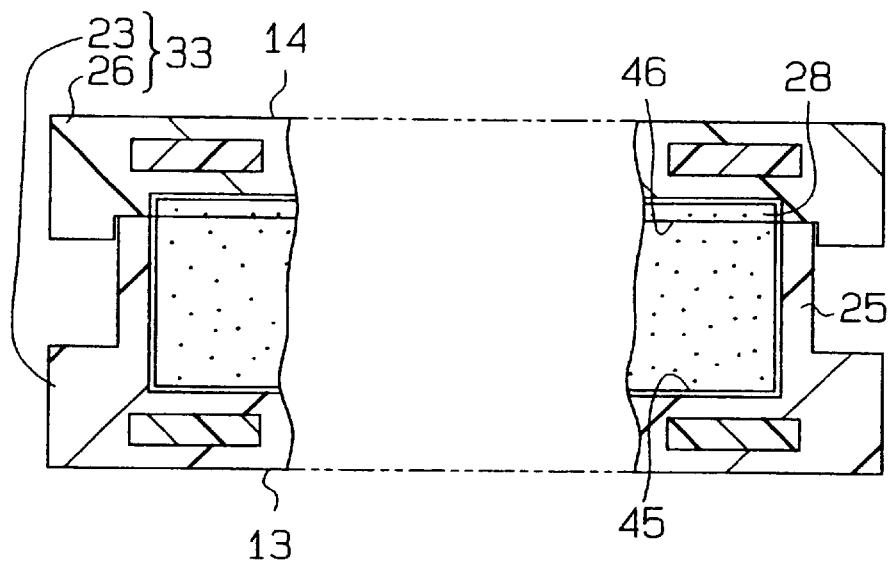
FIG. 4 is a cross-sectional view taken along line 4—4 of FIG. 2.

As shown in FIGS. 2, 3, 4 and 6, the first casing member 13 and the second casing member 14 include first and second conductive resin inner covers 23, 26, respectively. The inner covers 23, 26 form a conductive nonmetal member, which is a container 33 in this embodiment, and are located in part of the grip 121 adjacent to the plug portion 122. As shown in FIG. 4, the inner covers 23, 26 are integrated with the other parts of the casing members 13, 14 (shown by rectangles in FIG. 4) by insert molding. The inner covers 23, 26 form part of the casing members 13, 14 and are exposed to form terminals. The first inner cover 23 includes a panel 24 and a frame 25. The frame 25 is perpendicular to the panel 24. A notch 251 for receiving the cable 16 is formed in the frame 25. Like the first inner cover 23, the second inner cover 26 includes a panel 27 and a frame 28. A notch 281 for receiving the cable 16 is formed in the frame 28. The shape and the size of the first frame 25 are substantially the same as those of the second frame 28. As shown in FIG. 4, the frames 25, 28 contact each other when the casing members 13, 14 are integrated. The edge of the frame 25 and the edge of the frame 28 are welded to each other. The first and second inner covers 23, 26 form the container 33.

A clamp seat 30 is integrally formed with the first inner cover 23. A conductive metal clamp 31 is attached to the clamp seat 30 by a screw 32. The clamp 31 holds the cable 16, which determines the position of the cable 16 in the grip 121. The cable 16 enters the container 33 through the opening defined by the notches 251, 281, which are formed in the frames 25, 28 (see FIG. 7). The clamp 31 is electrically connected to a conductive shield layer 165, which coats the cable 16. The shield layer 165 is connected to a grounding terminal (not shown) of the electricity supplying apparatus 42.

Figure 2A:
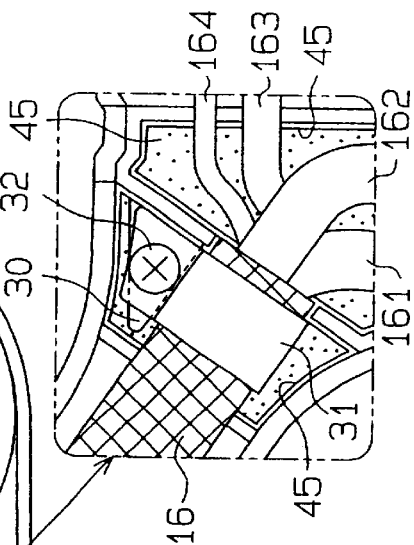
FIG. 2A is an enlarged cross-sectional view of the portion 2A of FIG. 2.
Figure 2B:
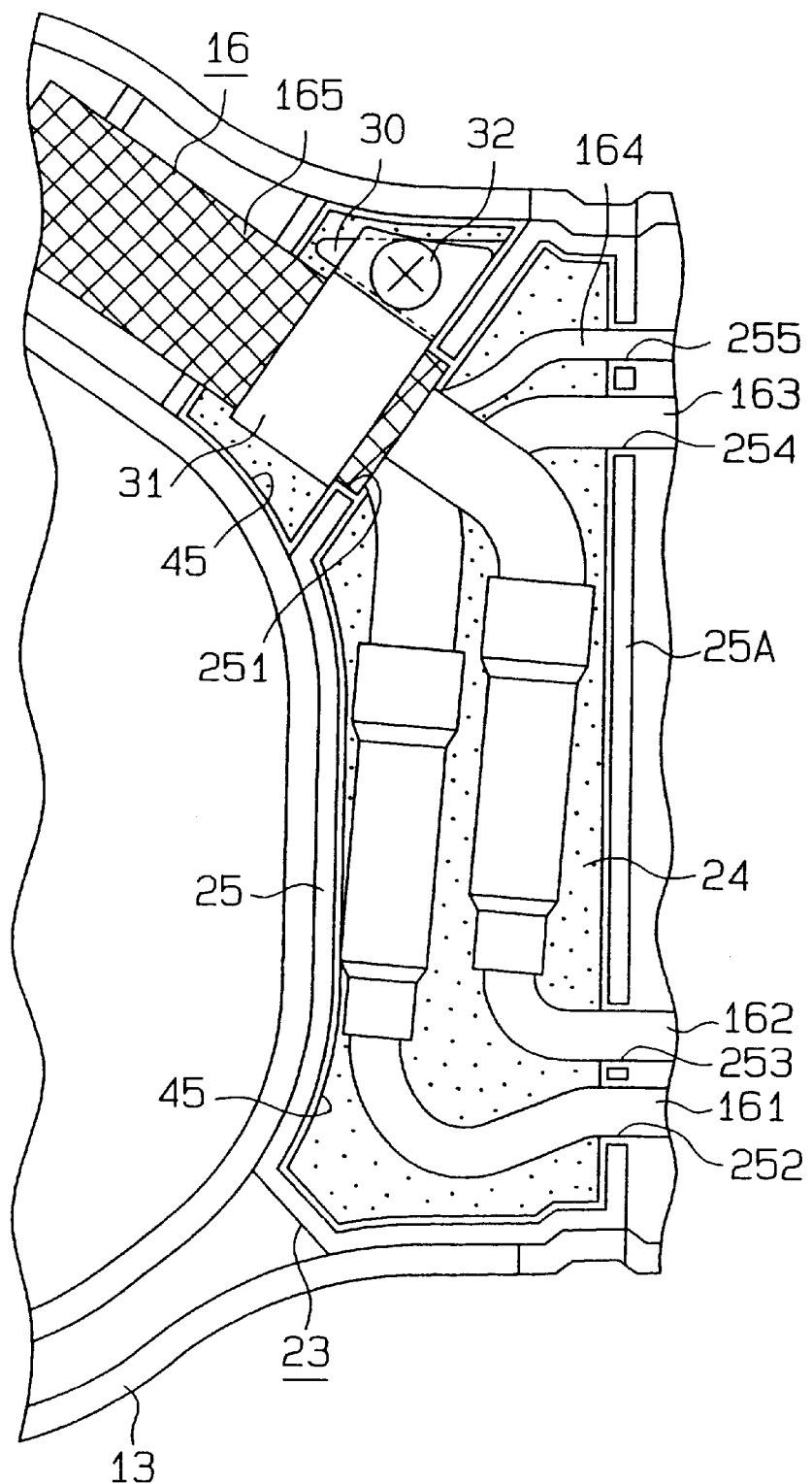
FIG. 2B is an enlarged cross-sectional view of FIG. 2.

As shown in FIGS. 2 to 2B, the power lines 161, 162 and the signal lines 163, 164, which are included in the cable 16, separate in the container 33. As shown in FIG. 2B, notches 252, 253, 254, 255 are formed in a wall 25A of the frame 25, which is adjacent to the plug portion 122. Also, four notches are formed in a wall 28A of the frame 28, which is adjacent to the plug portion 122. The notches in the wall 28A correspond to each of the notches 252 to 255. The notches 252 to 255 and the corresponding notches determine the positions of the lines 161 to 164. Specifically, the power lines 161, 162 are received by the notches 252, 253 and the corresponding notches, respectively. The signal lines 163, 164 are received by the notches 254, 255 and the corresponding notches, respectively. As shown in FIG. 2, the signal line 164 is connected to the antenna 20.

As shown in FIG. 1, the receptacle 10 includes an aluminum casing 34. A resin inner support 35 is located in the casing 34. The inner support 35 holds a ferrite core unit 36. The core unit 36 includes a pair of cores 361, 362. The reception coil 37 is wound about the core 361. FIG. 1 illustrates a state in which the paddle 11 is completely inserted into a cavity 101 of the receptacle 10 through an opening 102. In this state, the ferrite core 15 of the paddle 11 is aligned with the cores 361, 362 of the receptacle 10. When electric current is supplied to the power lines 161, 162, the vehicle battery is charged. In FIG. 1, the wall 25A of the frame 25 and the wall 28A of the frame 28 are located in the opening 102. The resin inner covers 23, 26 substantially close the opening 102.

A plurality of conductive metal terminals 341 are located in the wall of the opening 102. In the state of FIG. 1, the terminals 341 elastically contact the exposed portions of the inner covers 23, 26. The casing 34 is electrically connected to a vehicle grounding terminal (not shown).

Figure 5:
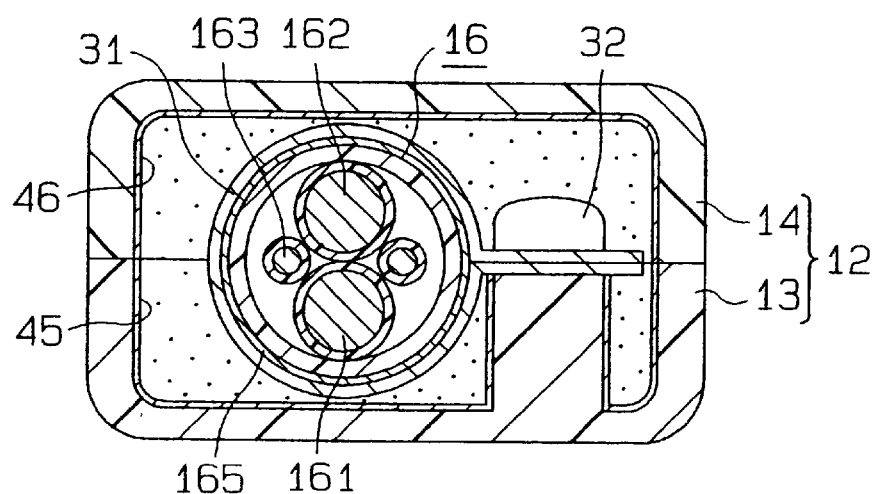
FIG. 5 is a cross-sectional view taken along line 5—5 of FIG. 2.

As shown in FIGS. 2, 2A and 3, a conductive metal member, which includes first and second conductive metal plating layers 45, 46, is formed on part of the inner surfaces of the grip 121. Specifically, the first plating layer 45 is formed on the inner surface of the first inner cover 23, the notch 251, the clamp seat 30 and a part of the inner surface of the first casing member 13 where the clamp seat 30 is located. The second plating layer 46 is formed on the inner surface of the inner cover 26, the notch 281 and a part of the inner surface of the second casing member 14 20 that faces the clamp seat 30. The plating layers 45, 46 are close to each other at the contacting edges of the casing members 13, 14, that is, between the edge of the frame 25 and the edge of the frame 28. As shown in FIG. 5, the first plating layer 45 is connected to the shield layer 165 by the clamp 31. In the drawings, the dots represent plating and not filler.

As shown in FIG. 1, an infrared sensor 38 and a communication circuit 39 are located in the inner support 35 of the receptacle 10. The communication circuit 39 actuates the infrared sensor 38. The infrared sensor 38 and the communication circuit 39 form an infrared transmitter-receiver. Also, an antenna 40 and a communication circuit 41 are located in the inner support 35. The antenna 40 and the communication circuit 41 form a radio transmitter-receiver. A magnetic sensor 44 is also located in the support 35. When the paddle 11 is completely inserted in the cavity 101 of the receptacle 10, the infrared sensor 38 of the receptacle 10 faces the infrared sensor 18 of the paddle 11, and the antenna 40 of the receptacle 10 is aligned with the antenna 20 of the paddle 11. In the state of FIG. 1, one of the magnets 21, 22 of the paddle 11 is aligned with the magnetic sensor 44 of the receptacle 10.

Figure 1A:
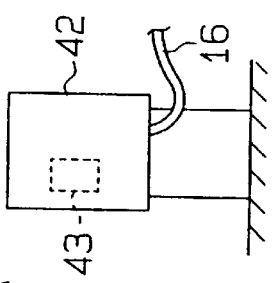
FIG. 1A is a diagrammatic side view illustrating an electricity supplying apparatus.

The substrate 17, the infrared sensor 18, the communication circuit 19, the infrared sensor 38 and the communication circuit 39 form an infrared communication system. The antenna 20, the antenna 40 and the communication circuit 41 form a radio communication system. The infrared communication system and the radio communication system can be selectively used. A controller 43 of the electricity supplying apparatus 42, which is shown in FIG. 1A, uses either the radio communication system or the infrared communication system while charging the vehicle battery. At this time, the controller 43 performs an interlock control procedure and monitors the charging state. When the paddle 11 is inserted into the receptacle 10 as shown in FIG. 1, the magnetic sensor 44 is turned on by either magnet 21 or 22. The ON state of the magnetic sensor 44 is transmitted to the controller 43 by either the radio communication system or the infrared communication system. Accordingly, the controller starts charging and monitoring.

The first embodiment has the following advantages.

In the state of FIG. 1, some of the noise radiated from the power lines 161, 162 and the reception coil 37 in the receptacle 10 is absorbed by the aluminum casing 34. The radiation noise is then converted into a noise current that flows to the vehicle grounding terminal. Radiation noise that heads for the opening 102 from the receptacle 10 is absorbed by the frames 25, 28 of the inner covers 23, 26, which substantially closes the opening 102. The noise is then converted into noise current that flows to the terminals 341 and the clamp 31.

The power lines 161, 162 are not covered by the shield layer 165 in the container 33. Noise that is radiated from these parts of the lines 161, 162 is absorbed by the plating layers 45, 46. The absorbed noise is then converted into a noise current that flows to the clamp 31. The noise current flows from the clamp 31 to the grounding terminal of the electricity supplying apparatus 42 through the shield layer 165.

As described above, the container 33 is made of conductive nonmetallic material, or conductive resin. The plating layers 45, 46 are made of conductive metal and are not exposed from the casing 12 of the paddle 11. The container 33 and the plating layers 45, 46 absorb noise. Generally, the resistance of conductive resin is relatively higher compared to conductive metals. Thus, the container 33 significantly limits the flow of noise current. However, the plating layers 45, 46 permit noise current to flow with little resistance. Therefore, radiation noise produced in the paddle 11 and the receptacle 10 during charging is effectively prevented from escaping from the charger coupling.

The plating layers 45, 46 must be formed prior to welding the casing members 13, 14 together. The edges of the casing members 13, 14, which include the edges of the frames 25, 28, are welded to each other. To facilitate welding, there is a slight clearance between each plating layer 45, 46 and the edge of the corresponding casing member 13, 14. However, the clearances are so small that the plating layers 45, 46 are sufficiently close to each other for electrical contact. Also, the plating layers 45, 46 are electrically connected by the frames 25, 28. Therefore, the resistance of the clearance is negligible. Therefore, noise current in the plating layer 46 smoothly flows to the clamp 31.

The conductive metal member functions adequately if it includes only thin films. Therefore, the conductive metal member is preferably formed by the plating layers 45, 46.

The power lines 161, 162 and the signal lines 163, 164 must be separated from the cable 16 somewhere in the paddle 11. Separating the lines 161, 162, 163 and 164 in the plug portion 122 is difficult due to the limited space. Thus, the lines 161, 162, 163 and 164 are separated in the grip 121. The surfaces of the exposed portions of the power lines 161, 162 are difficult to cover with shield layers. The container 33, which is made of a conductive resin, effectively prevents noise radiated from the lines 161, 162 from escaping.

The walls 25A, 28A of the frames 25, 28 substantially close the opening 102 and absorb radiation noise escaping from the opening 102. Radiation noise that is not absorbed by the walls 25A, 28A is absorbed by the panel 24, 27 and the part of the frames 25, 28 other than the walls 25A, 28A. The container 33, which houses the separated power lines 161, 162 and the signal lines 163, 164, has a double structure for blocking radiation noise and therefore effectively prevents radiation noise from escaping from the opening 102.

The conductive resin inner cover 23 is insert molded with the first casing member 13, and the conductive resin inner cover 26 is inserted molded with the second casing member 14. Conductive resin is preferred for forming the conductive nonmetal member, which includes the inner covers 23, 26, with the casing members 13, 14 by insert molding.

A second embodiment of the present invention will now be described with reference to FIGS. 6 and 7. Like or the same reference numerals are given to those components that are like or the same as the corresponding components of the embodiment of FIGS. 1 to 5.

Figure 6:
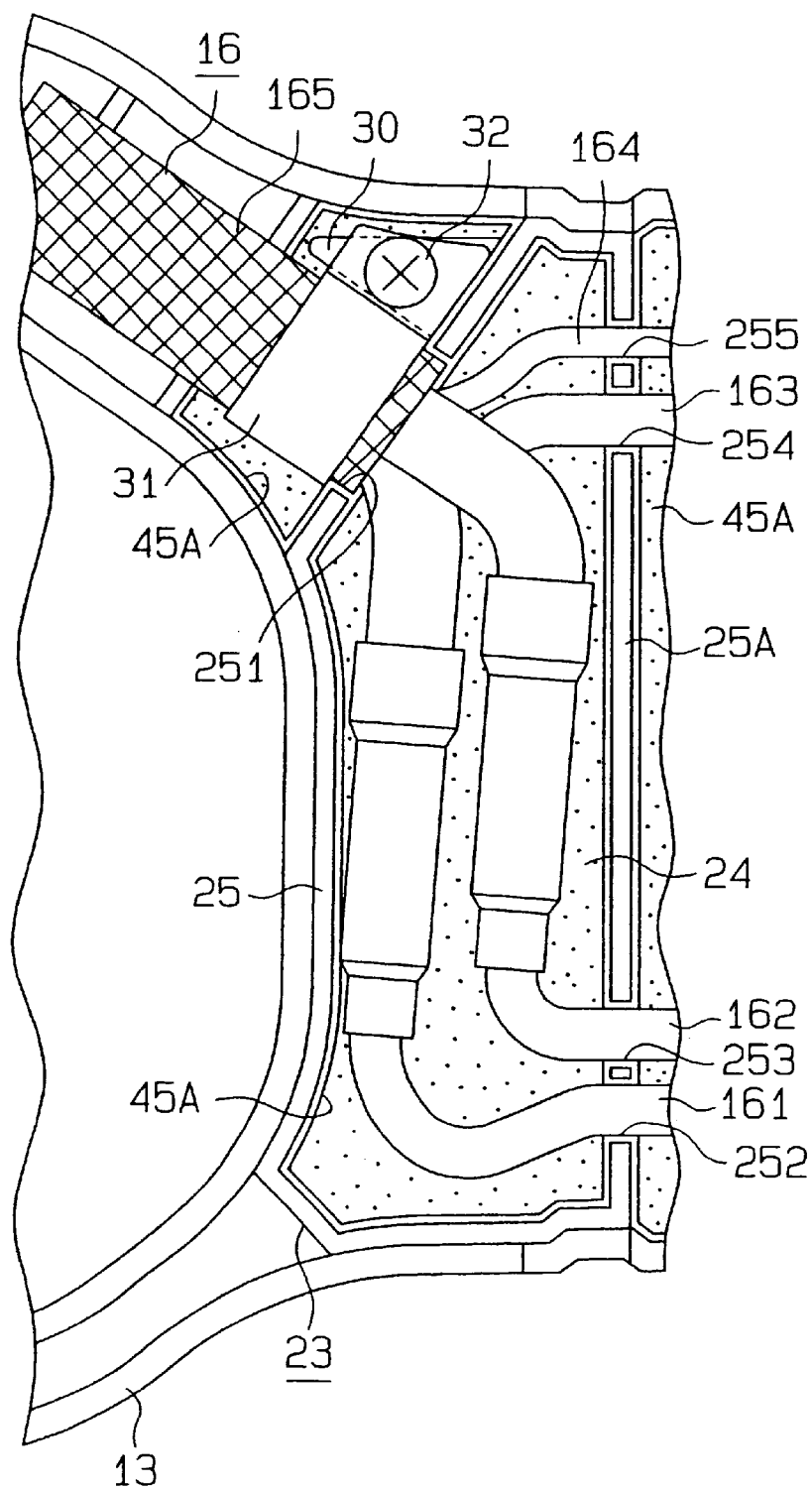
FIG. 6 is a partial cross-sectional view illustrating a casing members of a charging paddle according to a second embodiment of the present invention.
Figure 7:
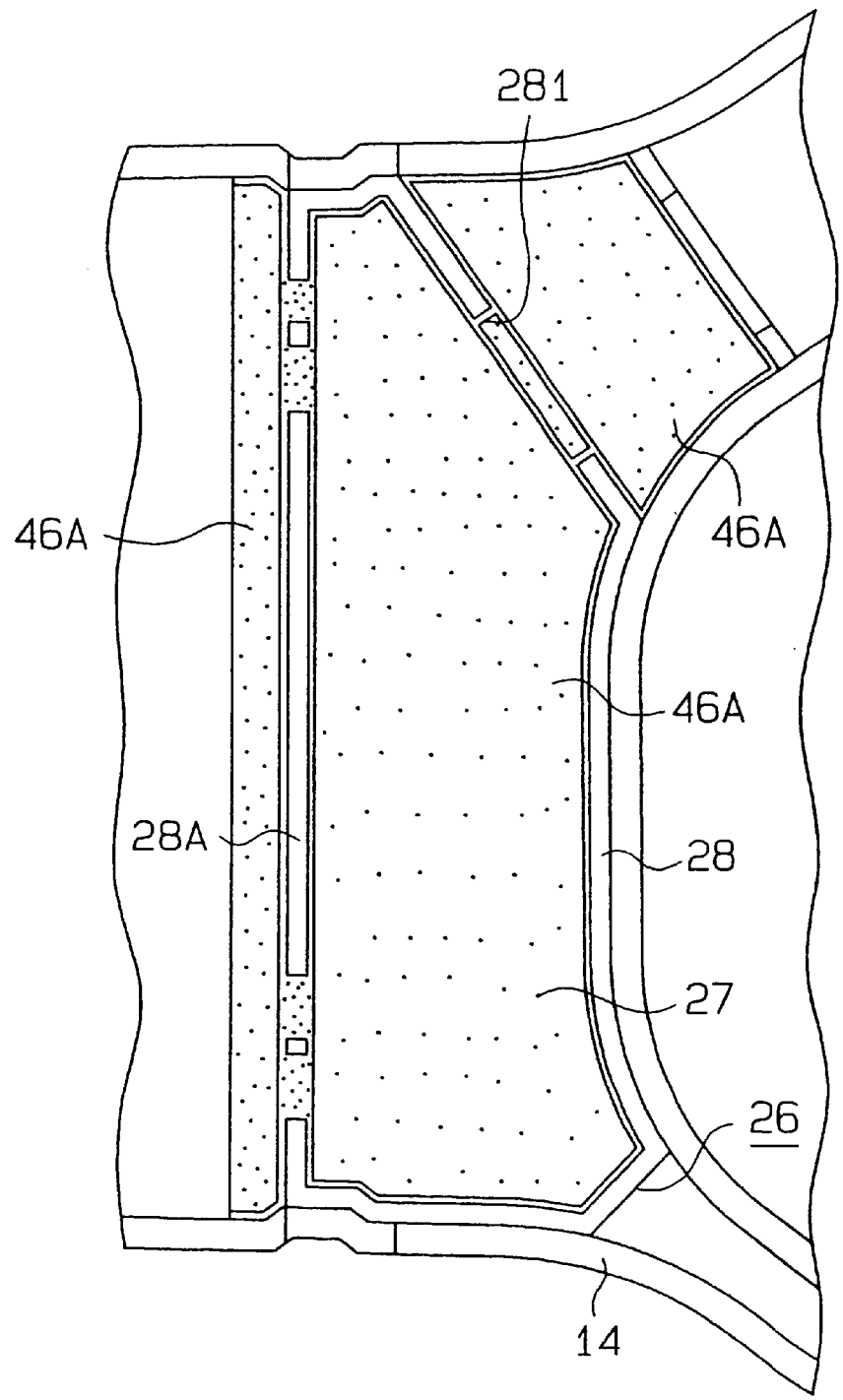
FIG. 7 is a partial cross-sectional view illustrating the other casing member of the charging paddle shown in FIG.6.
Figure 8:
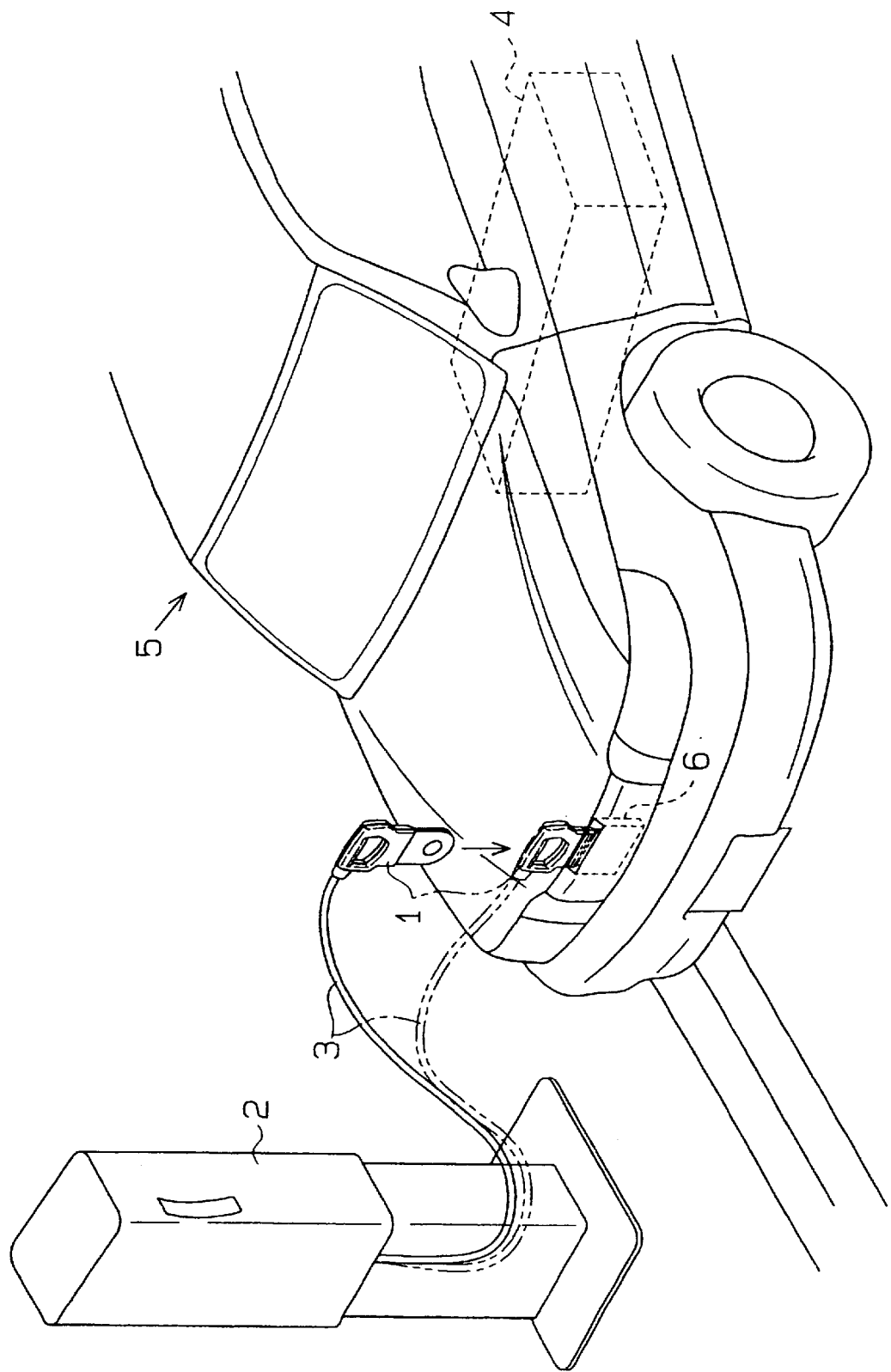
FIG. 8 is a perspective view illustrating a prior art charger coupling for an electric vehicle.

As shown in FIG. 6, a plating layer 45A of the second embodiment is formed on the notches 252 to 255 and partly on the inner surface of the plug portion 122 of the first casing member 13 in addition to the area of the plating layer 45 of the first embodiment. As shown in FIG. 7, a plating layer 46A of the second embodiment is formed on the notches formed in the wall 28A and partly on the inner surface of the plug portion 122 of the second casing member 14 in addition to the area of the plating layer 46 of the first embodiment.

As described above, the plating layers 45A, 46A are formed on both sides of the walls 25A, 28A and partly on the inner surface of the plug portion 122 in addition to the area of the plating layers 45, 46 in the first embodiment. Like in the first embodiment, the walls 25A, 28A substantially close the opening 102 when the paddle 11 is inserted into the receptacle 10. In this state, the plating layers 45A, 46A prevent radiation noise from escaping from the opening 102 more effectively than the plating layers 45, 46.

It should be apparent to those skilled in the art that the present invention may be embodied in many other specific forms without departing from the spirit or scope of the invention. Particularly, it should be understood that the invention may be embodied in the following forms.

In the illustrated embodiments, the first inner cover 23 and the first casing member 13 may be integrally formed with a nonconductive resin, and the inner cover 26 and the second casing member 14 may be integrally formed with a nonconductive resin.

In the embodiment of FIGS. 1 to 5, the inner covers 23, 26 may be made of conductive metal and the plating layers 45, 46 may be omitted.

In the embodiment of FIGS. 1 to 5, a conductive metal net may be embedded in each inner cover 23, 26 and electrically connected to the shield layer 165. The nets functions as part of the conductive metal member.

Therefore, the present examples and embodiments are to be considered as illustrative and not restrictive and the invention is not to be limited to the details given herein, but may be modified within the scope and equivalence of the appended claims.

What is claimed is:

1. A paddle of an inductive charger coupling, the paddle being connected to a power source through a power line, part of the power line being located in the paddle, wherein the paddle is inserted into an opening of a receptacle for supplying electricity to a receptacle, the paddle comprising:
   a case;
   a conductive metal member located in the case, wherein the conductive metal member absorbs noise radiated from the power line in the paddle and converts the absorbed noise into a noise current, and
   a conductor for conducting the noise current to the outside of the paddle, the conductor being electrically connected to the conductive metal member in the paddle.

2. The paddle according to claim 1, wherein, when the paddle is inserted into the receptacle opening, the conductive metal member substantially blocks the opening.

3. The paddle according to claim 1, wherein the conductive metal member comprises a layer of plating.

4. The paddle according to claim 1, further including a conductive nonmetal member for supporting the conductive metal member.

5. The paddle according to claim 4, wherein the conductive nonmetal member comprises a conductive resin.

6. The paddle according to claim 4, wherein the conductive nonmetal member comprises a container that substantially surrounds part of the power line, and wherein at least part of the conductive metal member is located on the inner surface of the container.

7. The paddle according to claim 6, wherein the case comprises a first case member and a second case member, the container includes a first inner cover, which is fixed to the first case member, and a second inner cover, which is fixed to the second case member, wherein the conductive metal member is a first conductive metal member, which is located in the first inner cover, and wherein the paddle further comprises a second conductive metal member, which is fixed to the second inner cover.

8. The paddle according claim 1, wherein the conductor is connected to a grounding terminal.

9. The paddle according to claim 8, wherein the paddle is connected to a cable, and wherein the power line is one of a plurality of lines located in the cable.

10. The paddle according to claim 9, wherein the conductor comprises a shield that is located in the cable, and wherein the shield surrounds the lines.

11. The paddle according to claim 10, wherein the lines are exposed from the shield and are separated at a separation location within the paddle, and wherein the conductive metal member substantially surrounds the separation location.

12. A paddle of an inductive charger coupling, the paddle being connected to a power source through a power line, part of the power line being located in the paddle, wherein the paddle is inserted into an opening of a receptacle for supplying electricity to a receptacle, the paddle comprising:
   a case;
   a conductive metal member located in the case, wherein the conductive metal member absorbs noise radiated from the power line in the paddle and converts the absorbed noise into a noise current;
   a conductor for conducting the noise current to the outside of the paddle, the conductor being electrically connected to the conductive metal member in the paddle, and
   a conductive resin member located in the paddle, wherein the conductive resin member supports the conductive metal member.

13. The paddle according to claim 12, wherein, when the paddle is inserted into the receptacle opening, the conductive metal member substantially blocks the opening.

14. The paddle according to claim 12, wherein the conductive metal member comprises a layer of plating.

15. The paddle according to claim 12, wherein the conductive resin member comprises a container that substantially surrounds part of the power line, and wherein at least part of the conductive metal member is located on the inner surface of the container.

16. The paddle according to claim 15, wherein the case comprises a first case member and a second case member, the container includes a first inner cover, which is fixed to the first case member, and a second inner cover, which is fixed to the second case member, wherein the conductive metal member is a first conductive metal member, which is located in the first inner cover, and wherein the paddle further comprises a second conductive metal member, which is fixed to the second inner cover.

17. The paddle according claim 12, wherein the conductor is connected to a grounding terminal.

18. The paddle according to claim 17, wherein the paddle is connected to a cable, and wherein the power line is one of a plurality of lines located in the cable.

19. The paddle according to claim 18, wherein the conductor comprises a shield that is located in the cable, the shield surrounding the lines, wherein the lines are exposed from the shield and are separated at a separation location within the paddle, and wherein the conductive metal member substantially surrounds the separation location.

20. A paddle of an inductive charger coupling, the paddle being connected to a power source through a power line, part of the power line being located in the paddle, wherein the paddle is inserted into an opening of a receptacle for supplying electricity to a receptacle, the paddle comprising means for preventing radiation noise from escaping from the paddle and the receptacle.

* * * * *

UNITED STATES PATENT AND TRADEMARK OFFICE
CERTIFICATE OF CORRECTION

PATENT NO. : 6,297,614 B2  
DATED : October 2, 2001  
INVENTOR(S) : Takashi Hyogo Page 1 of 1

It is certified that error appears in the above-identified patent and that said Letters Patent is hereby corrected as shown below:

<u>Column 4,</u>
Line 8, please change "second casing member 14 20" to -- second casing member 14 --.

Signed and Sealed this

Twenty-first Day of May, 2002

Attest:

Attesting Officer

JAMES E. ROGAN
*Director of the United States Patent and Trademark Office*